Patented Jan. 8, 1952

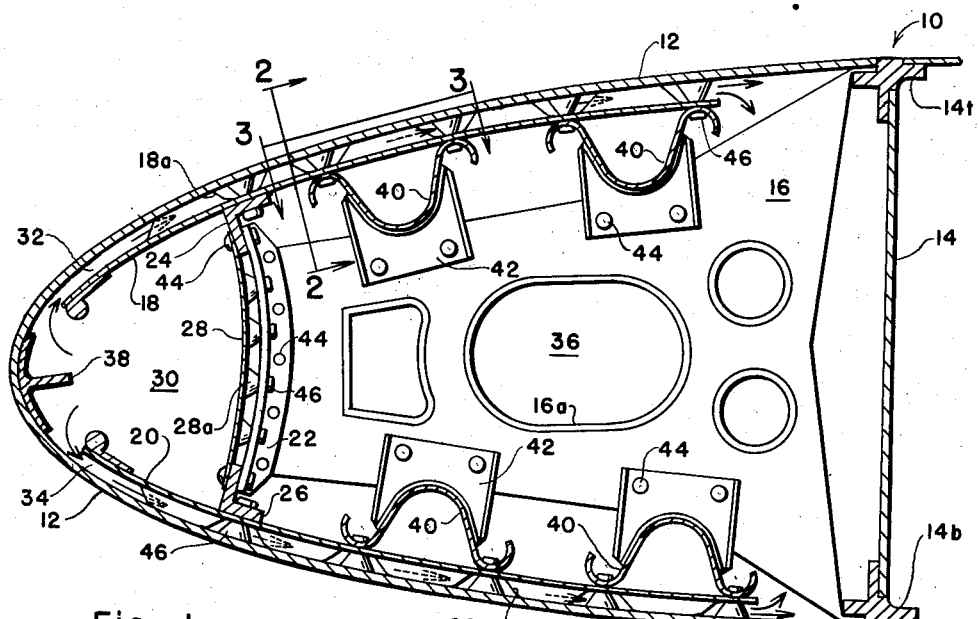

2,581,760

UNITED STATES PATENT OFFICE 2,581,760

AIRPLANE DEICING CONSTRUCTION

Edward Harpoothian, Los Angeles, and Milton A. Miner, Pacific Palisades, Calif., assignors to Douglas Aircraft Company, Inc., a corporation of California Application April 2, 1946, Serial No. 659,012

12 Claims. (Cl. 244—134)

This invention relates to the prevention and removal of ice and more particularly to a de-icing construction for aircraft wings and other surfaces subject to the formation of ice thereon.

The de-icing of airplane surfaces has been successfully accomplished by the external application of alternately inflatable rubber boots or shoes and the application of a heating medium on or within the surfaces, as well as by other means. Each of these methods and constructions has presented such objectionable features as the addition of weight, servicing requirements, effect upon wing lift, overheating of the wing structure and other difficulties.

The present construction is directed to the heating type de-icing system in which the source of heat may be either exhaust gases from the power plant, supercharged air to the engine induction manifold or the cabin pressure system, or any other fluid containing heat capable of transfer to the surface of the wing or other aircraft components to be de-iced. The invention further relates to an improved metallic wing construction as applied to stressed-skin de-icing surfaces in which a relatively efficient heat transfer arrangement is provided and the skin reinforcement elements are protected from undue overheating and deformation.

It is a primary object of the present invention to provide an efficient de-icing surface and structure for wings and other aircraft components. It is a further object to provide such an arrangement which is particularly adapted for stressed-skin-construction in which the stress-taking elements are protected from excessive heating and buckling. It is a corollary purpose of this invention to provide a stressed-skin de-icer construction having efficient heat transfer characteristics to the external skin subject to icing as well as a construction of relatively high strength-to-weight ratio.

Other important objects and advantages of this invention will become apparent to those skilled in the art from the following description and accompanying drawings forming a part hereof, in which:

Fig. 1 is a cross-sectional view of the leading edge of an airplane wing showing a preferred embodiment of the present de-icer construction;

Fig. 2 is a detailed cross-sectional view of the de-icer heating duct, as taken along the lines 2—2 of Figs. 1 and 3, looking chordwise;

Fig. 3 is a fragmentary plan view of the same, as indicated by the lines 3—3 of Fig. 1, with the outer skin partly broken away; and Fig. 4 is a detailed cross-sectional view looking spanwise showing the duct construction and the longitudinal stiffener attachment at the lower surface of the wing.

Referring now to Fig. 1, an airplane wing 10 has a leading edge skin or covering 12 extending continuously forward of the spanwise wing spar 14. The latter is provided with an upper or top chord member 14t and a lower chord member 14b to which the rearwardly extending edges of the skin 12 are suitably attached. A chordwise extending bulkhead or diaphragm 16 is also preferably attached at its upper and lower rear corners to the flanges of the spar chords 14t and 14b, being provided with apertures or lightening holes 16a and cut-away edges for purposes of permitting spanwise flow of the exhaust gases, as hereinafter more fully described.

Inwardly spaced sheets or liners 18 and 20 are attached to the upper and lower surfaces of the outer skin 12, respectively, being spaced by the depth of the dimples 12a in the skin. To the front edge of the bulkhead 16 there is riveted a curved member 22 of angle cross-section which may alternatively be formed from a bent plate. The upper and lower ends of the angle member 22 are attached to spanwise extending angles 24 and 26 which in turn are riveted to certain of the aforesaid dimples in the outer skin 12, and the liner sheets 18 and 20, by an attachment means to be hereinafter more fully described. To the front side of the substantially vertically extending legs of the angles 24 and 26 there is riveted a curved sheet 28, similarly dimpled as at 28a, which is continuous and extends in the spanwise direction within the wing leading edge.

It will accordingly be noted that the curved sheet 28 in cooperation with the outer skin 12 and the liner sheets 18 and 20 form a spanwise extending inlet duct or plenum 30 for the entrance of hot air or gases along the nose portion of the wing leading edge. The spacial relationship of the upper skin 12 and the liner 18 provides a relatively shallow heating space or passage 32, and in a like manner the spaced lower surface 12 and liner 20 provide a lower surface heat exchange space 34. As indicated by the arrows in Fig. 1 the inlet flow of the hot gases within the plenum chamber 30 extends both upwardly and downwardly and then rearwardly within the spaces 32 and 34 to perform their heating of the upper and lower surfaces of the wing leading edge, and to be directed rearwardly at the trailing edges of the liners 18 and 20 in a direction generally toward the spar 14.

The back of the curved plate or sheet 28, in conjunction with the outer skin 12 and the liners 18 and 20, as well as the spar 14, all form an exhaust chamber or duct 36 of somewhat greater total cross-section than the inlet header or chamber 30. The cooled or exhausted gases, having been materially reduced in temperature due to heat transmitted and dissipated through the skin surfaces, then pass both around the cut-away edges of the bulkhead plate 16, as well as through the open spaces provided by the lightening holes 16a. It will be understood that where the present leading edge construction is utilized as a radiator or an inter-cooler for supercharged air, suitable connections will be provided to return the cooled air to the engine or cabin installation. On the other hand, where exhaust gases are utilized for the de-icing purposes, suitable ducts and outlets will preferably be provided to permit escape of the cooled exhaust gases to the airstream.

The extreme nose portion of the leading edge stressed-skin 12 is preferably reinforced by a spanwise extending T-shaped member 38 having its flanges suitably bent to conform with the sharp curvature of the nose portion to which it is suitably attached by flush riveting. The stem portion of the reinforcing member 38 extends into the pressure chamber 30 between the reinforced front ends of the liner sheets 18 and 20, serving to divide and disbute the flow into the mouths of the heating spaces 32 and 34.

The stressed-skin wing structure is reinforced by a plurality of spanwise extending hat-shaped sections or other strengthening members 40. The crowns or back portions of these spanwise stiffeners 40 are suitably attached to the bulkhead element 16 by the flanged clips 42 being suitably riveted as at 44. The flanged portions 40a of the spanwise stiffeners are attached to the outer skin 12 through the intermediate liner or inner skin 18 or 20 by means of the special countersunk rivets 46. These rivets are provided with pan-shaped or shouldered conic head portions 46a which fit within the suitably dimpled portions 12a of the outer skin 12 such that they provide a flush riveting connection therewith. Between the shank 46c and tapered head of these rivets there is provided a transverse shoulder 46b which bears against the dimpled portion of the skin sheet 12 and against which the liner 18 or 20 and the flange 40a of the stiffener member is attached or gripped by the flat driven or set-up head 46d of these flush rivets.

This provides in effect an inner skin spaced from the outer skin around the inner periphery of the leading edge of the wing 10. The transmission of stress from the wing skin 12 to the hat members 40 is accordingly effected by the use of the rivets 46 having the flattened surfaces 46b under the head such that the skin 12 is separated from the liner 18 or 20 by the depth of the dimple 12a receiving the rivet head. The flange 40a of the hat section lies against the inside of the liner 18 or 20, being engaged by the set-up or driven head 46d of the rivet, and the special riveted joint resulting therefrom has been found to be as solid and stable structurally as the usual riveted joint, while giving superior heat transfer values.

Referring now more particularly to Figs. 2 and 3, it will be noted that the liners 18 and 20 are provided with a series of short or interrupted corrugations or arcuately deformed portions 18a which preferably extend in a chordwise direction. They are preferably disposed both in chordwise aligned relationship with the rows of rivets 46 and additionally in intermediate rows spaced between the chordwise rows of rivets, as measured in the spanwise direction. The corrguations 18a in the spanwise direction. The corrugations 18a are spaced apart sufficiently from each other to permit passage of the hot air therebetween and are of such a height or depth that they touch the inside of the skin sheets 12. These corrugations thereby serve to prevent buckling of the liners 18 and 20 against the skin 12 due to expansion while sufficient contact of the hot air with the skin is provided to accomplish the desired heating thereof.

While corrugations 18a of the shape and arrangement shown in the drawings have been found to give the best results it is considered that dimpling could alternatively be utilized in certain installations to effect similar advantages. It will be noted from the figures of the drawings that the successive spanwise rows of corrugations are not staggered with respect to those immediately adjacent. This even spacing of the corrugations was found advantageous and is one of the more important features of the present invention in that the construction permits the flow of heated air to pass between the corrugations in a chordwise direction without interference at a very high velocity. It is considered that in certain installations the corrugations might be staggered, although the arrangement shown has in most cases permitted the best uninterrupted air flow between the metallic skin sheets. It will be understood that each of the elements comprising the de-icer construction shown and described will be of metal or other material not effected by the high temperatures to which the parts may be subjected. The construction shown and described prevents the reinforcing members 40 from becoming overheated inasmuch as the hat sections only contact the liners at the riveted joints at which point the material of the rivets 46 serve as radiating fins to conduct the heat to the outer air. This arrangement accordingly not only provides a de-icing construction of efficient heat exchange characteristics but also assures a properly protected reinforcing system for a stressed-skin wing leading edge of high strength-to-weight ratio. Considerable rigidity is given the wing leading edge portion due to its formation into a box-spar construction assisted by the reinforced skin and liners in addition to the main spar 14.

The application of heat to aircraft structure is admittedly detrimental and dangerous, but the applicants' improved de-icer construction has the capability of holding to a minimum the heat transfer from the passage lying between the outer and inner skins to the structure within the interior of the wing. Although there is a natural tendency for the heat to flow towards the side of the passage having the lower temperature, the heat transfer to the internal structure in the present construction has been greatly minimized by the rather limited or constricted areas of contact between the bases of the dimples and the inner skin or liner.

It will be obvious to those skilled in the art that other forms and embodiments of the preferred arrangement shown and described may be resorted to after an understanding of the present invention, but it is intended that all other such forms and modifications shall come within the scope and spirit of the present invention as more particularly defined in the appended claims.

We claim:

1. A wing de-icer construction of the heat exchange type comprising an outer skin, an inner skin spaced therefrom to provide a passage for heated air therebetween, said inner skin having outwardly deformed portions in the form of interrupted rounded end corrugations extending chordwise in parallel rows and in contact with the inner surface of said outer skin, and rows of spaced fastening elements joining said inner and outer skin and in alignment with said parallel rows of the inner skin deformed portions arranged such that the flow of heated air through said passage at a high velocity is uninterrupted and said inner skin is stiffened against buckling due to said heated air by said outwardly deformed portions.

2. A wing surface de-icer of the heat exchange type, including: an outer skin having inwardly projecting dimples; an inner skin in contact with the dimples of said outer skin; spanwise stiffener members having flanges in contact with the inner surface of said inner skin; and fastening means for joining said skins and said stiffener member flanges in said contacting relationship, said juncture of said skins and said stiffening member flanges being of sufficiently constricted area to minimize the heat transfer therebetween.

3. A wing surface de-icer of the heat exchange type, including an outer skin forming the upper and lower wing surfaces at the leading edge; said outer skin having inwardly projecting dimples; inner skin sheets in contact with the dimples of said outer skin; spanwise stiffening members having flanges in contact with the inner surface of said inner skin sheets; fastening means for joining said skins and said stiffener flanges in a restricted contacting relationship arranged to minimize the heat transfer therebetween; a nose spar attached to said inner skin sheets adjacent the upper and lower wing surfaces and substantially normal to said wing surfaces; a main spar spaced rearwardly from said nose spar attached to the said outer skin at said upper and lower wing surfaces; the said inner skin extending fore and aft of said nose spar, terminating aft of the leading edge of the wing and forward of said main spar to thereby form a spanwise nose header for heating fluid, and a return header between said spars, respectively, said headers being interconnected by the heat exchange passages formed between said outer skin and said inner skin sheets.

4. In a stressed-skin leading edge construction adapted for de-icing by a heating fluid, a leading edge outer skin having chordwise rows of conically inwardly extending dimpled portions, an inner skin spaced from said outer skin and in contact with the dimpled portions thereof, said inner skin having chordwise rows of apertures in alignment with like apertures in said outer skin dimpled portions, said inner skin having rounded outwardly deformed chordwise extending dimples in the form of interrupted corrugations in chordwise alignment with said apertures, spanwise extending stiffening members having apertured flanges matching said chordwise extending rows of apertures, and conic rivets having shoulders bearing against the inner ends of said outer skin dimples for attaching said outer skin, said inner skin and said stiffening member flanges together in chordwise rows aligned with said interrupted inner sheet corrugations arranged for the uninterrupted chordwise flow of heated fluid at high velocity between said inner and outer skins and between said chordwise rows of dimples and interrupted corrugations, said inner skin being stiffened chordwise by said outwardly deformed dimples and spanwise by said stiffening members against buckling and deformation due to said heating fluid.

5. A de-icing wing construction comprising an outer skin arranged to be heated to prevent ice formation, an inner skin spaced from said outer skin to provide a heat exchange passage therebetween, said outer skin provided with inwardly dimpled portions defining apertures in chordwise and spanwise extending rows, said inner skin defining apertures matching the apertures in said dimpled portions in said outer skin, said inner skin provided with elongated dimples extending outwardly and in the chordwise direction, apertured U-shaped stiffener elements extending in the spanwise direction having flanges in contact with the underside of said inner skin along said spanwise rows of apertures, and fastening means for attachment of said outer skin, said inner skin and said stiffener element flanges extending through the said apertures in said inwardly extending outer skin dimpled portions, said inner skin and said stiffener elements.

6. A de-icing wing construction comprising an outer skin arranged to be heated to prevent ice formation, an inner skin spaced from said outer skin to provide a heat exchange passage therebetween, said outer skin provided with inwardly dimpled portions defining apertures in chordwise and spanwise rows, said inner skin defining apertures matching the apertures in said dimpled portions in said outer skin and in corresponding chordwise and spanwise rows, said inner skin provided with elongated dimples extending outwardly and in the chordwise direction, the depth of said inner and outer skin dimples determining the spacing between said skins for said heat-exchange passage, U-shaped stiffener elements extending in the spanwise direction having apertured flanges in minimum area contact with said inner skin along said spanwise rows of apertures, and fastening means for attachment of said outer skin, said inner skin and said stiffener element flanges extending through said inwardly extending outer skin dimples, the minimum area of said stiffener flanges in contact with said inner skin serving to minimize the conduction of heat inwardly into said wing structure.

7. A wing de-icer construction comprising an outer skin, an inner skin spaced therefrom to provide a passage for heated air therebetween, said outer skin having inwardly deformed apertured portions, said inner skin having outwardly deformed portions in the form of interrupted rounded-end corrugations extending chordwise in parallel rows and in contact with the inner surface of said outer skin, the said deformed portions of both said skins establishing the space for said heated air passage, and rows of spaced fastening elements joining said inner and said outer skins at said inwardly deformed apertured portions in said outer skin and in alignment with said parallel rows of said inner skin deformed portions arranged such that flow of heated air in the chordwise direction through said passage at a high velocity is uninterrupted.

8. A wing de-icer construction comprising an outer skin, an inner skin spaced therefrom to provide a passage for heated air therebetween, said outer skin having inwardly deformed apertured portions, said inner skin having outwardly deformed portions in the form of interrupted rounded-end corrugations extending chordwise in parallel rows and in contact with the inner surface of said outer skin, inner skin defining apertures extending in spanwise rows matching the inwardly deformed apertured portions of said outer skin, the said deformed portions of both said skins establishing the space for said heated air passage, spanwise extending U-shaped stiffening means having flanges in minimum area contact with said inner skin along said spanwise rows of apertures and fastening means joining said inner and outer skins and said stiffener flanges in such manner that said fastening means serves as fins for conducting heat outwardly to said outer skin and said minimum area of stiffener flange in contact with said inner skin minimizes conduction of heat inwardly of said wing construction.

9. A wing leading edge de-icer construction comprising an outer skin having inwardly dimpled apertured portions, an inner skin in contact with the dimpled portions of said outer skin, defining apertured portions matching the inwardly dimpled apertured portions of said outer skin, spanwise stiffener elements having flanges in contact with the inner surface of said inner skin at said apertured portions, and fastening means for joining said apertured skins at said stiffener element flanges in contacting relationship at said apertured portions such that said fastening means serve as fins for conducting heat outwardly and the juncture of said inner skin and said stiffener element flanges is of such constricted area as to minimize the heat transfer therebetween inwardly of said leading edge construction.

10. A wing leading edge surface de-icer construction of the rib-less heat exchange type, including an outer skin forming the upper and lower surfaces of the wing leading edge, said outer skin provided with inwardly projecting dimples, said dimples defining apertures within said outer skin, inner skin sheets in contact with the dimples of said outer skin, said inner skin sheets apertured in a manner corresponding to the apertures in said outer skin, spanwise extending apertured stiffening members having flanges in contact with the inner surface of said inner skin sheets at the inner sheet apertures corresponding to the apertures of said dimpled portions, fastening means for joining said apertured skins and said stiffener flanges in a restricted contacting relationship arranged to minimize the heat transfer inwardly of said wing surface construction, a nose spar attached to said inner skin sheets adjacent to said upper and lower portions of said spar and substantially normal thereto, a main spar spaced rearwardly from said nose spar attached to said outer skin adjacent the upper and lower surfaces of the wing, and spanwise spaced bulkheads extending chordwise between said main and nose spars and supporting said stiffener elements such that rib means are dispensed with.

11. A wing leading edge surface de-icer construction of the rib-less heat exchange type, including an outer skin forming the upper and lower surfaces of the wing leading edge, said outer skin provided with inwardly projecting dimples, said dimples defining apertures within said outer skin, inner skin sheets in contact with the dimples of said outer skin, said inner skin sheets apertured in a manner corresponding to the apertures in said outer skin, spanwise stiffening members having flanges in contact with the inner surface of said inner skin sheets at the inner sheet apertures corresponding to the apertures of said dimpled portions, fastening means for joining said skins and said stiffener flanges in a restricted contacting relationship arranged to minimize the heat transfer inwardly of said wing surface construction, a nose spar attached to said inner skin sheets adjacent to said upper and lower portions of said spar and substantially normal thereto, a main spar spaced rearwardly from said nose spar attached to said outer skin adjacent the upper and lower surfaces of the wings, spanwise spaced bulkheads extending chordwise between said main and nose spars and supporting said stiffener elements such that rib means are dispensed with, the said inner skin extending fore and aft of said nose spar, terminating aft of the leading edge of the wing and forward of said main spar to form a spanwise nose header for heating fluid, and a return header between said spars, respectively, said headers being interconnected by the heat exchange passages formed between said outer skin and inner skin sheets.

12. In a stressed-skin leading edge construction adapted for de-icing by hot gases, an outer skin adapted for heating to prevent ice formation, an inner skin spaced from said outer skin to provide a heat exchange passage therebetween, spanwise extending stiffening elements inwardly disposed with respect to said inner skin and means for attaching both said skins and said stiffening elements arranged such that said attachment means conducts heat outwardly toward said outer skin de-icing surface, said inner skin having outwardly deformed rounded chordwise dimples in the form of interrupted corrugations in chordwise alignment with said attachment means arranged such that the flow of heated air at a high velocity through said heat exchange passage is uninterrupted.

EDWARD HARPOOTHIAN.
MILTON A. MINER.

REFERENCES CITED

The following references are of record in the file of this patent:

UNITED STATES PATENTS

| Number | Name | Date |
|---|---|---|
| 1,970,565 | Kean | Aug. 21, 1934 |
| 2,050,327 | Howard | Aug. 11, 1936 |
| 2,256,393 | Klein | Sept. 16, 1941 |
| 2,447,095 | Schmidt | Aug. 17, 1948 |
| 2,478,878 | Smith et al. | Aug. 9, 1949 |

FOREIGN PATENTS

| Number | Country | Date |
|---|---|---|
| 462,237 | Germany | July 6, 1928 |
| 97,141 | Sweden | Oct. 17, 1939 |